United States Patent
Yokota et al.

[11] Patent Number: 5,326,131
[45] Date of Patent: Jul. 5, 1994

[54] AIR BAG MOUNTING STRUCTURE FOR AIR BAG DEVICE FOR PASSENGER'S SEAT

[75] Inventors: Keishi Yokota; Tadahiro Igawa; Akira Kokeguchi; Takeshi Satoh; Yoshiaki Sakata, all of Shiga, Japan

[73] Assignee: Takata Corporation, Tokyo, Japan

[21] Appl. No.: 77,045

[22] Filed: Jun. 16, 1993

[30] Foreign Application Priority Data

Jul. 3, 1992 [JP] Japan .................................. 4-176781

[51] Int. Cl.$^5$ .............................................. B60R 21/16
[52] U.S. Cl. .............................. 280/728 A; 280/728 R; 280/743 R
[58] Field of Search ............... 280/728 R, 728 A, 732, 280/743 R

[56] References Cited

U.S. PATENT DOCUMENTS

| | | | |
|---|---|---|---|
| 3,656,790 | 4/1972 | Truesdell | 280/728 A |
| 5,209,519 | 5/1993 | Shiga et al. | 280/728 A |

FOREIGN PATENT DOCUMENTS

| | | | |
|---|---|---|---|
| 4-55143 | 2/1992 | Japan | 280/728 A |
| 4-169356 | 6/1992 | Japan | 280/728 A |
| 1531069 | 11/1978 | United Kingdom | |

Primary Examiner—Eric Culbreth
Attorney, Agent, or Firm—Kanesaka & Takeuchi

[57] ABSTRACT

An air bag mounting structure for an air bag device for a passenger's seat, wherein an end portion of an air bag is mounted to a side of a retainer of an air bag device for a passenger's seat characterized in that the retainer is divided into a front-half portion and a rear-half portion; a pocket portion into which the rear rim of the front-half portion is inserted is provided at the front rim of the rear-half portion; the rear rim of the front-half portion is inserted along with the end portion of the air bag into the pocket portion; the end portion of the air bag extends over the rear rim of the front-half portion; and the front-half and the rear-half portions of the retainer and the end portion of the air bag are secured by insertion members which are inserted through the pocket portion.

6 Claims, 3 Drawing Sheets

AIR BAG MOUNTING STRUCTURE FOR AIR BAG DEVICE FOR PASSENGER'S SEAT

FIELD OF THE INVENTION

The present invention relates to an air bag device for a passenger's seat of a motor vehicle and, more particularly, to a structure for securely mounting an end portion of an air bag to a retainer of an air bag device.

DESCRIPTION OF THE RELATED ART

The air bag mounting structure of a conventional air bag device for a passenger's seat will be described with reference to FIG. 3 and FIG. 4. An inflator 12 is disposed on the rear portion (the inner portion) of a retainer 10. An end portion of an air bag 14 is folded and sewed to form a long thin bag. 16 represents the portion thus sewed.

A plate 20 is inserted into a space 18 inside the bag-shaped portion 14A. The plate 20 has rivet insertion holes 22 formed therein, and the bag-shaped portion of the air bag 14 and the retainer 10 also have rivet insertion holes 24 and 26, respectively which are in the same arrangement as the holes 22.

The bag-shaped portion 14A into which the plate 20 is inserted is brought into contact with the inner surface of the front-half portion of the retainer 10 and secured with a blind rivet 28. The end portion of the air bag 14 is thus secured to the retainer 10 as shown in FIG. 4.

When the motor vehicle collides with an object and the inflator 12 is actuated, the gas ejected from the inflator 12 causes the air bag 14 to be extended for protecting the passenger. When the air bag 14 is extended, a large amount of force is applied to the air bag 14 in the direction indicated by the arrow 100 in FIG. 4. The end portion of the air bag 14 must be securely connected to the retainer 10 even if such a large amount of force is applied. Taking this into consideration, as described above, the air bag 14 is provided with the bag-shaped portion 14A into which the plate 20 is inserted.

In the air bag mounting structure of the abovedescribed conventional air bag device for a passenger's seat, the air bag 14 must be sewed to provide it with the elongate bag-shaped portion 14A in order to securely mount the end portion of the air bag 14 to the retainer 10 and, in addition, the plate 20 must be inserted into the bag-shaped portion 14A. This increases the time and labor required for mounting the air bag 14.

OBJECT AND SUMMARY OF THE INVENTION

It is an object of the present invention to provide an air bag mounting structure for an air bag device for a passenger's seat which is simple and easy to be assembled.

An air bag mounting structure for an air bag device for a passenger's seat according to the first aspect of the present invention is a structure wherein an end portion of an air bag is mounted to the side of a retainer of an air bag device for a passenger's seat, and is characterized in that the retainer is divided into a front-half portion and a rear-half portion, a pocket portion into which the rear rim of the front-half portion is inserted is provided at the front rim of the rear-half portion, the rear rim of the front-half portion is inserted along with the end portion of the air bag into the pocket portion, the end portion of the air bag extends around the rear rim of the front-half portion, and the front-half and rear-half portions of the retainer and the end portion of the air bag are secured by an insertion member which is inserted through the pocket portion.

An air bag mounting structure for an air bag device for a passenger's seat according to the second aspect of the present invention is based on an air bag mounting structure according to the first aspect, wherein the end portion of the air bag extends over both sides of the rear rim of the front-half portion of the retainer and the insertion member is inserted through the air bag at both sides of the rear rim of the front-half portion of the retainer.

An air bag mounting structure for an air bag device for a passenger's seat according to the third aspect of the present invention is based on an air bag mounting structure according to the second aspect, wherein projections are provided on the outer surface of the rear rim of the front-half portion of the retainer, on which the air bag is hooked.

An air bag mounting structure for an air bag device for a passenger's seat according to the fourth aspect of the present invention is based on an air bag mounting structure according to the first aspect, wherein the insertion member is a bolt.

An air bag mounting structure for an air bag device for a passenger's seat according to the fifth aspect of the present invention is based on an air bag mounting structure according to the first aspect, wherein the rear-half portion of the retainer comprises a lower retainer in the form of a container and a middle retainer mounted to the lower retainer so that it covers the front portion of the lower retainer; the middle retainer comprises a main plate portion which extends across the front portion of the lower retainer and is formed with openings for allowing inflation gas to pass therethrough and a raised piece which is raised from an end portion of the main plate portion toward the rear of the retainer; the tip of the raised piece is secured to the lower retainer; and the above pocket portion is formed between the base of the raised piece and the front portion of the lower retainer.

In an air bag mounting structure for an air bag device for a passenger's seat according to the present invention, an end portion of an air bag is hooked at the rear rim of the front-half portion of a retainer, and the front-half portion of the retainer, along with the end portion of the air bag, is inserted into a pocket portion. Thereafter, an insertion member is inserted through the pocket portion to securely attach the front-half portion of the retainer and the air bag to the rear-half portion of the retainer.

In this air bag mounting structure, it is not necessary to sew the air bag to form a long thin bag portion nor to insert a plate into this bag-shaped portion.

In the air bag mounting structure for an air bag device for a passenger's seat according to the second aspect of the present invention, the end portion of the air bag extends over both sides of the rear rim of the front-half portion of the retainer and the insertion member is inserted through the air bag at both sides of the front-half portion. As a result, the insertion member firmly resists the force applied in the direction in which the air bag is pulled, thereby reliably preventing the air bag from being pulled out.

In the air bag mounting structure for an air bag device for a passenger'seat according to the third aspect of the present invention, the end portion of the air bag is hooked by the projection on the outer surface of the front-half portion of the retainer. This structure makes it easy to insert the air bag and the front-half portion of the retainer into the pocket portion. Specifically, when the air bag along with the front-half portion of the retainer is inserted into the pocket portion, the possibility that the air bag will slip out of place or detach from the front-half portion of the retainer is eliminated. This greatly improves the efficiency with which the air bag device is assembled.

In the air bag mounting structure for an air bag device for a passenger's seat according to the fourth aspect of the present invention, a bolt is used as the insertion member. By sufficiently fastening the bolt, it is possible to firmly clamp the front-half portion of the retainer and the air bag with the pocket portion. This greatly improves the strength of the connection between the front-half and the rear-half portions of the retainer and the mounting strength of the air bag.

In the air bag mounting structure for an air bag device for a passenger's seat according to the fifth aspect of the present invention, the rear-half portion of the retainer is constituted by the lower retainer and the middle retainer, and the pocket portion can be easily formed between the middle retainer and the lower retainer by connecting the two.

PREFERRED EMBODIMENTS

Figure 1:
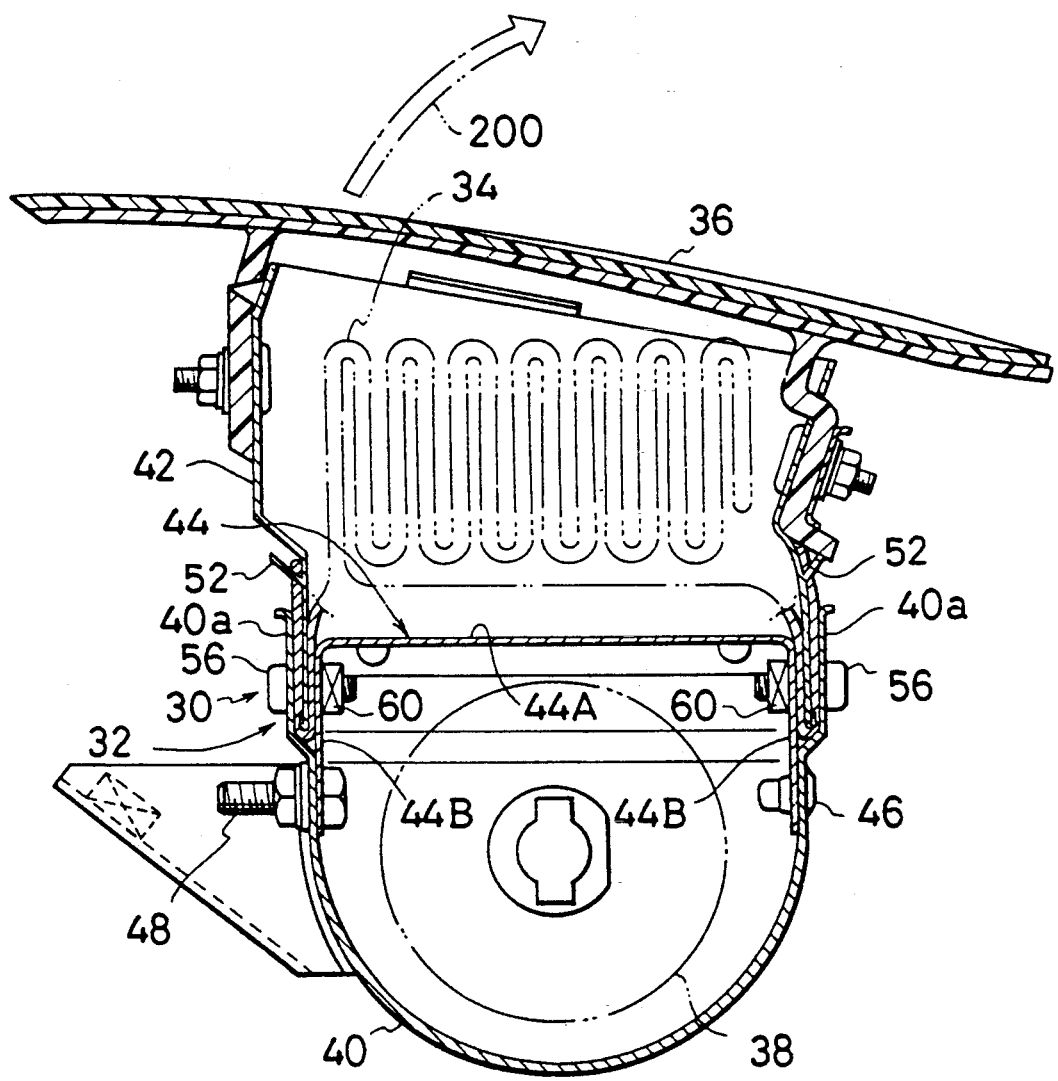
FIG. 1 is a sectional view of an air bag device having a structure of an embodiment of the present invention.
Figure 2:
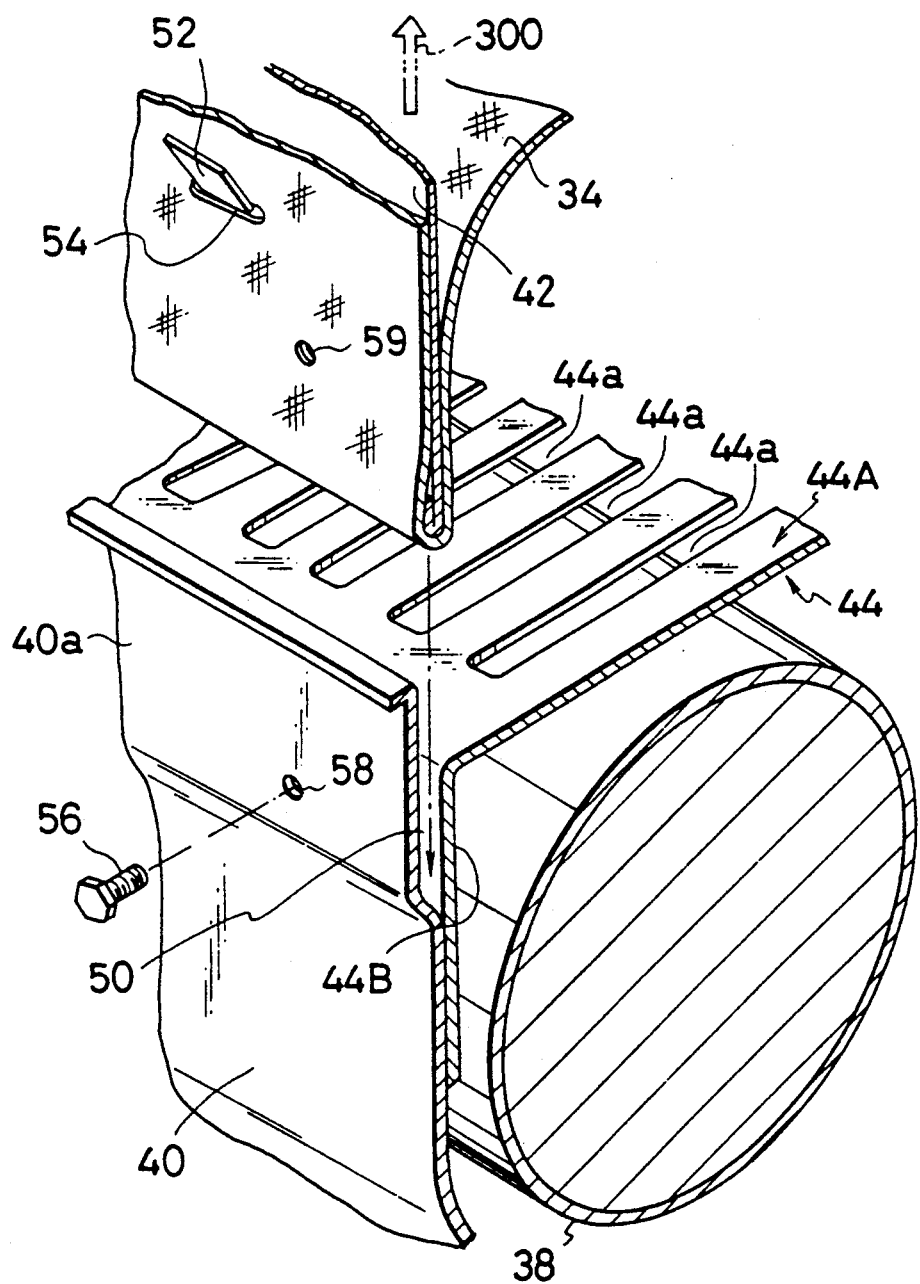
FIG. 2 is a perspective view showing a method of mounting an air bag.
Figure 3:
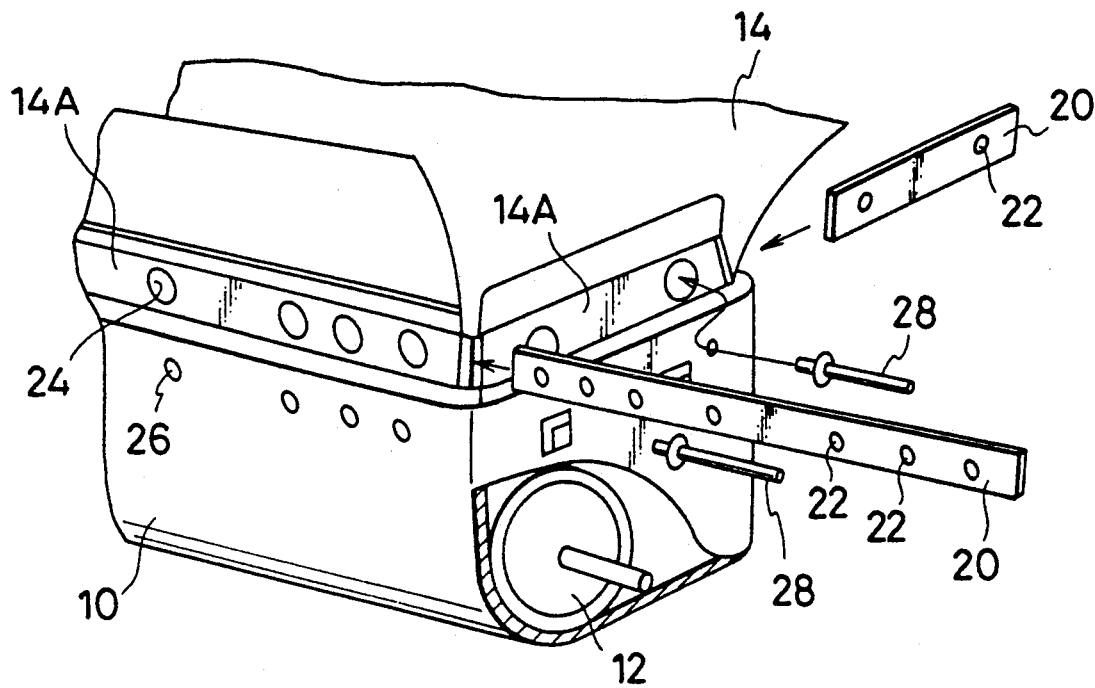
FIG. 3 is a perspective view showing a conventional method of mounting an air bag.
Figure 4:
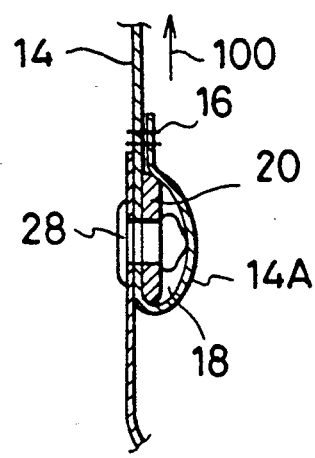
FIG. 4 is a sectional view showing an air bag mounting structure of a conventional air bag device for a passenger's seat.

An embodiment of the present invention will now be described with reference to FIG. 1 and FIG. 2. An air bag device 30 comprises a retainer 32, an air bag 34 folded and contained in the retainer 32, a lid 36 covering an opening at the front-half portion of the retainer 32, and an inflator (gas generator) 38 for inflating the air bag 34.

The retainer 32 comprises a lower retainer 40 in the form of a container, a rectangular shape upper retainer 42, and a middle retainer 44 secured to the lower retainer 40 so that it covers an opening of the front portion of the lower retainer 40.

The middle retainer 44 comprises a main plate portion 44A having slits 44a for allowing gas ejected by the inflator 38 to pass through and a raised piece 44B raised by bending the end of the main plate portion 44A. The raised piece 44B is secured to the lower retainer 40 by a rivet 46 and a bolt 48.

The front rim portion 40a of the lower retainer 40 projects outward in the form of steps, and a pocket portion 50 is formed between the front rim portion 40a and the raised piece 44B.

An end portion of the air bag 34 extends around the rear rim of the upper retainer 42. A projection 52 is provided on the outer surface of the rear rim portion of the upper retainer 42 and an opening 54 provided in the air-bag 34 is hooked by this projection 52.

The rear rim of the upper retainer 42, wherein the air-bag 34 extends on both sides of the rear rim, is inserted into the pocket portion 50 and thereafter a bolt 56 is inserted through the pocket portion 50 and screwed tight.

The lower retainer 40 has a hole 58 provided beforehand, through which the bolt 56 is to be inserted. The air bag 34, upper retainer 42, and middle retainer 44 also have similar holes 59. A nut 60 is welded to the inner surface of the middle retainer 44, and the bolt 56 is threaded into this nut 60. As a result, the upper retainer 42 is connected to the lower retainer 40 and the middle retainer 44 to complete the retainer 32, and the end portion of the air bag 34 is securely mounted to the retainer 32.

When the motor vehicle collides with an object and the inflator 38 ejects gas, the air bag 34 expands to push the lid 36 out. This causes a tear portion (not shown) of the lid 36 to break. As a result, the lid 36 opens as indicated by the arrow 200 in FIG. 1, causing the air bag 34 to expand largely into the cabin. At this time, a large amount of force as indicated by the arrow 300 in FIG. 2 is applied to the air bag 34.

It is obvious from the above description, in the present embodiment, the upper retainer 42 constitutes the front-half portion of the retainer and the lower retainer 40 and the middle retainer 44 constitute the rear-half portion of the retainer.

In the air bag mounting structure of the present embodiment for an air bag device for a passenger's seat, having the above-described configuration, the air bag 34 can be securely mounted by simply hooking the opening 54 of the air bag 34 on the projection 52 of the upper retainer 42, inserting the upper retainer 42 along with the end portion of the air bag 34 into the pocket portion 50, and fastening the bolt 56. This greatly improves operability.

In the air bag mounting structure of the present embodiment for an air bag device for a passenger's seat, the end portion of the air bag 34 extends over both sides of the rear rim of the upper retainer, and the bolts 56 are inserted through the air bag at both sides of the upper retainer. These bolts 56 firmly resist the force 300 applied in the direction in which the air bag 34 is pulled, at two points, i.e. points on both sides, reliably preventing the air bag 34 from being pulled out.

Further, in the air bag mounting structure of the present embodiment for an air bag device for a passenger's seat, the end portion of the air bag 34 is hooked on the projection 52 on the outer surface of the upper retainer 42. This makes it easy to insert the air bag 34 and the upper retainer 42 into the pocket portion 50.

In the air bag mounting structure of the present embodiment for an air bag device for a passenger's seat, the pocket portion 50 can be formed between the lower retainer 40 and the middle retainer 44 merely by securely connecting them. This simplifies the assembly of the retainer.

As described above, in the air bag mounting structure of the present invention for an air bag device for a passenger's seat, the end portion of the air bag is hooked on the rear rim of the front-half portion of a retainer, inserted into a pocket portion and secured by an insertion member such as a bolt. Thus, the end portion of the air bag can be securely mounted to the retainer through an extremely simple operation and the operability in the assembly of the air bag device is greatly improved.

In the air bag mounting structure of the present invention for an air bag device for a passenger's seat, the end portion of an air bag is securely held by an insertion member such as a bolt. This reliably prevents the air bag from being pulled out.

In an air bag mounting structure of the present invention for an air bag device for a passenger's seat, the end portion of an air bag is hooked on a projection on the outer surface of a front-half portion of a retainer. This makes it extremely easy to insert the air bag and the front-half portion of the retainer into the pocket portion, thereby greatly improving the efficiency of the air bag device assembly.

In the air bag mounting structure of the present invention for an air bag device for a passenger's seat, the strength of the connection between the front-half portion and the rear-half portion of the retainer and the mounting strength of the air bag can be greatly improved by fastening the bolts as the insertion members.

In the air bag mounting structure of the present invention for an air bag device for a passenger's seat, the pocket portion can be formed between the middle retainer and the lower retainer by securing the middle retainer to the lower retainer. This simplifies the assembly of the air bag device.

What is claimed is:

1. An air bag mounting structure for an air bag device for a passenger's seat, said air bag device having an air bag with an end portion, comprising,
    a retainer fixed with the end portion of the air bag, said retainer including a front-half portion having a rear rim, said end portion of the air bag being arranged to extend over the rear rim; and a rear-half portion attached to the front-half portion,
    said rear-half portion including a lower retainer in a form of a container and having a front portion; a middle retainer attached to the lower retainer to cover the front portion of said lower retainer, said middle retainer including a main plate portion extending across the front portion of the lower retainer and having openings for allowing inflation gas to pass therethrough, and a raised portion raised from an end portion of the main plate portion toward the lower retainer and having a tip and a base, said tip of the raised portion being secured to said lower retainer; and a pocket portion formed between the base of the raised portion and the front portion of the lower retainer, said rear rim of the front-half portion together with the end portion of the air bag extending over the rear rim being inserted into the pocket portion, and
    insertion members inserted through the pocket portion to secure the front-half and rear-half portions of the retainer and the end portion of the air bag.

2. An air bag mounting structure for an air bag device for a passenger's seat according to claim 1, wherein the end portion of said air bag extends over two sides of the rear rim of the front-half portion of said retainer, and said insertion members are inserted through the air bag at two sides of the rear rim of the front-half portion of the retainer.

3. An air bag mounting structure for an air bag device for a passenger's seat according to claim 2, wherein projections are provided on an outer surface of the rear rim of the front-half portion of said retainer and said air bag is hooked onto said projections.

4. An air bag mounting structure for an air bag device for a passenger's seat according to claim 3, wherein openings are provided at the end portion of said air bag and the openings are hooked onto said projections.

5. An air bag mounting structure for an air bag device for a passenger's seat according to claim 1, wherein the insertion members are bolts.

6. An air bag mounting structure for an air bag device for a passenger's seat according to claim 1, wherein a front end portion of said lower retainer projects outward in the form of steps and said pocket portion is formed at the projecting portion.

* * * * *